United States Patent

[11] 3,603,212

| [72] | Inventor | Howard M. Geyer |
| | | Dayton, Ohio |
| [21] | Appl. No. | 840,232 |
| [22] | Filed | July 9, 1969 |
| [45] | Patented | Sept. 7, 1971 |
| [73] | Assignee | Pneumo Dynamics Corporation |
| | | Cleveland, Ohio |

[54] SERVO ACTUATOR AND LOCKING MECHANISM THEREFOR
11 Claims, 5 Drawing Figs.

[52] U.S. Cl. .................................................. 92/17,
92/33, 192/143
[51] Int. Cl. .................................................. F15b 15/26
[50] Field of Search ........................................... 188/82.3,
82.4; 92/3, 4, 31, 33, 13, 17; 192/143

[56] References Cited
UNITED STATES PATENTS

| 394,383 | 12/1888 | Miller ........................... | 92/4 |
| 2,199,328 | 4/1940 | Baer et al. ..................... | 92/31 X |
| 2,337,766 | 12/1943 | Newell ........................... | 92/31 |
| 2,688,227 | 9/1954 | Geyer ........................... | 92/33 X |
| 2,688,232 | 9/1954 | Geyer ........................... | 92/33 X |
| 2,819,589 | 1/1958 | Geyer ........................... | 92/33 X |
| 2,979,034 | 4/1961 | Geyer ........................... | 92/33 X |

Primary Examiner—Martin P. Schwadron
Assistant Examiner—R. H. Lazarus
Attorney—Stephen M. Mihaly ABSTRACT: Locking mechanism includes a pair of one-way clutch elements having reverse locking capabilities for locking of an actuator against axial movement in opposite directions upon selective engagement of a pair of braking surfaces with their associated clutch elements by application of an external load to the actuator. A pair of brake release pistons may be selectively actuated to disengage one of such braking surfaces from its associated clutch element to permit movement of the actuator in a desired direction, while at the same time establish firm engagement between the other braking surface and associated clutch element to prevent an external load acting on the actuator from reversing the direction of actuator movement.

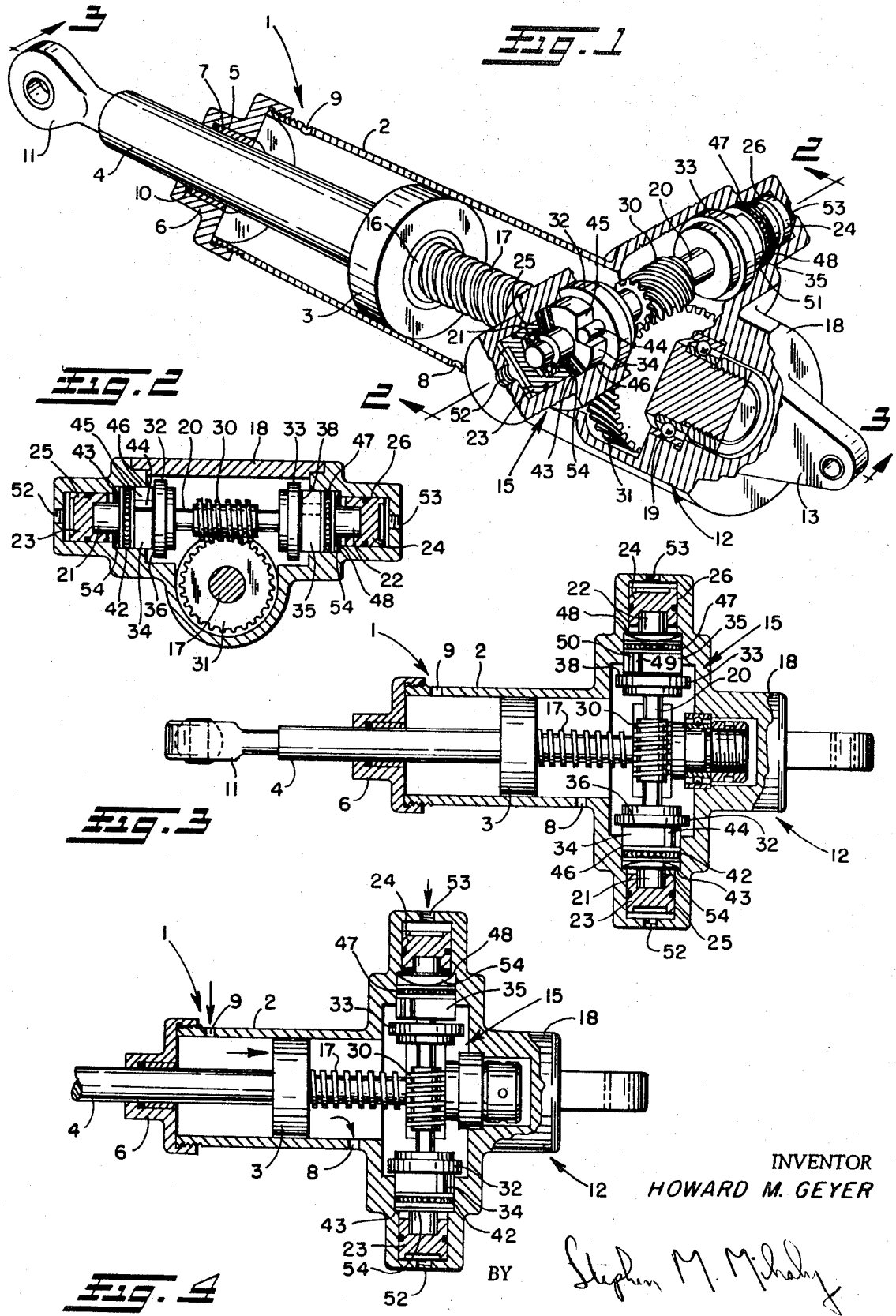

SERVO ACTUATOR AND LOCKING MECHANISM THEREFOR

BACKGROUND OF THE INVENTION

The present invention generally relates to a servo actuator and locking mechanism therefor which prevents undesired actuator movements in either direction due to external loads. Upon release of the locking mechanism, actuator movements are permitted in one direction or the other, but not in both directions, whereby a change in the external load cannot by itself reverse the direction of actuator movement.

Locking mechanisms of various types have previously been effectively used for selective locking of actuators against movement in one or both directions by externally applied loads. Upon release of such locking mechanisms, the actuators may be extended or retracted as desired by applying fluid pressure to the actuators to either supplement or overcome the external load, depending upon whether the external load is in the same or opposite direction of desired movement.

If, for example, the external load is a tension load and it is desired to extend the actuator, upon release of the locking mechanism, fluid pressure supplied to the extend port will assist the external load in moving the actuator in the desired direction. On the other hand, if a compressive load is applied to the actuator and it is desired to extend the actuator, sufficient fluid pressure must be supplied to the extend port to overcome the external compressive load before releasing the locking mechanism, or the actuator will be caused to move in the opposite direction by the external load. The reverse conditions must exist for retracting the actuator.

Ordinarily, the fact that the locking mechanism only prevents movement of the actuator in the direction of the external load is of no concern, since the locking mechanism is usually not released until the resultant of the total forces acting on the actuator is in the direction of the desired movement. However, if the external load is in opposition to the applied fluid pressure and increases to a level slightly above the applied fluid pressure during movement in the direction of the applied fluid pressure or is initially in the same direction as the applied fluid pressure and then reverses after release of the locking mechanism, the external load may cause an undesired reversal in the direction of actuator movement at least initially before the locking mechanism can effectively reengage.

SUMMARY OF THE INVENTION

It is accordingly a principal object of this invention to provide a locking mechanism for preventing an undesirable reversal in the direction of movement of an actuator due to an increase or reversal in the external load overcoming the fluid pressure force applied to the actuator.

A further object is to provide such a locking mechanism which will selectively prevent actuator movements in either direction by external loads.

These and other objects of the present invention are achieved using a locking mechanism having a pair of one-way clutch elements with reverse locking capabilities, one for selectively locking the actuator against movement in one direction upon engagement by a first braking surface driven by the actuator, and the other for selectively locking the actuator against movement in the opposite direction when engaged by a second braking surface driven by the actuator upon application of an external load urging the actuator in opposite directions. A pair of brake release pistons are also provided for disengaging one of the braking surfaces from its associated clutch element to permit movement of the actuator in a desired direction, while at the same time establishing firm engagement between the other braking surface and associated clutch element to assure against an undesired reversal in the direction of actuator movement due to the external load.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a perspective fragmentary sectional view of a preferred form of actuator and locking mechanism therefor constructed in accordance with this invention, shown under no-load conditions;

FIG. 2 is a fragmentary transverse section through the locking mechanism of FIG. 1, taken on the plane of the line 2—2, thereof;

FIG. 3 is a fragmentary longitudinal section through the actuator and locking mechanism of FIG. 1, taken on the plane of the line 3—3;

FIG. 4 is a fragmentary longitudinal section view similar to FIGS. 3, except that the locking mechanism has been moved to a position permitting retraction of the actuator but not extension thereof.

DESCRIPTION OF THE PREFERRED EMBODIMENT

Figure 5:
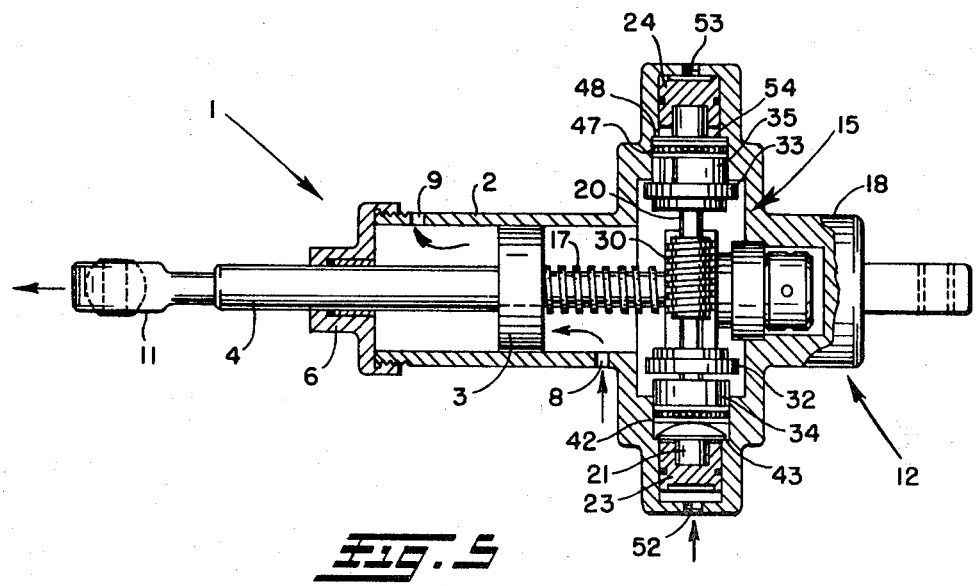
FIG. 5 is a fragmentary longitudinal sectional view also similar to FIG. 3, except that the locking mechanism has been moved to a position permitting extension of the actuator but not retraction thereof.

Referring now in detail to the drawings and first especially to FIGS. 1 through 3 thereof, there is shown a servo actuator 1 in the form of a cylinder 2 containing a piston 3. Projecting from one end of the piston 3 is a hollow rod 4 which extends through an opening 5 in an end cap 6 closing one end of the cylinder. A sleeve bearing 7 or other suitable bearing may be disposed within the end cap opening 5 to provide sliding contact with the rod, thus facilitating extension and retraction of the rod 4 by application of fluid pressure to of the cylinder extend port 8 or retract port 9 at opposite ends of the cylinder 2, and a suitable packing 10 may be inserted in the opening 5 adjacent the bearing 7 to prevent fluid leakage between the rod 4 and wall of the opening. The outer end 11 of the actuator rod 4 maybe provided with suitable means for attachment to a movable load device, not shown. A head assembly 12 which provides a closure for the other end of the cylinder 2 has a flange projection 13 thereon to facilitate attachment of that end of the actuator to a suitable stationary support.

The exact position of the load device may ordinarily be controlled by fluid pressure actuation of the actuator 1 in known manner. However, if during movement of the actuator rod 4 in one direction an external load is applied in opposition to the actuator movement which is of greater magnitude than the fluid pressure force, the actuator will be caused to move in the reverse direction. Moreover, once the load device has been moved to the desired position, external loads may disturb the position thereof. In order to prevent such undesired movement, there is provided a locking mechanism 15 in accordance with this invention in association with the actuator 1 which not only locks the actuator against undesired movements by external loads applied thereto, but also prevents a reversal in the direction of movement of the actuator by external loads during fluid pressure actuation thereof, in a manner to be subsequently fully described. Within the actuator piston 3 there is fixed a nut 16 having threaded engagement with an Acme screw shaft 17, one end of which extends into the hollow rod 4, and the other end of which is journaled in the housing 18 for the head assembly 12 by a bearing 19. Since the rod 4 is held against rotation by connection to the load device previously described, and the head assembly 12 is held against movement by connection to a suitable stationary support, axial movement of the piston 3 and nut 16 carried thereby will cause rotation of the screw shaft 17. Accordingly, if the screw shaft is restrained against rotation under certain conditions, axial movement of the piston 3 and rod 4 will also be prevented, which is the function of the locking mechanism 15.

The locking mechanism 15 includes a transverse wormshaft 20, the ends of which are journaled in bearings 21 and 22 carried by a pair of transversely movable brake release pistons 23 and 24 disposed in aligned chambers 25 and 26 in the head assembly housing 18 on opposite sides of the longitudinal centerline of the actuator. Fixed to the transverse shaft 20 intermediate the ends thereof is a worm gear 30 which meshes with a worm wheel 31 mounted on the screw shaft 17 for rotation therewith. Also fixed to the transverse shaft 20 on opposite sides of the worm gear 30 are a pair of brake flanges 32 and 33, and between the brake flanges 32 and 33 and brake release pistons 23 and 24 there are disposed one-way clutch elements 34 and 35 which are freely rotatable and slidable on the shaft 20.

As clearly shown in FIGS. 2 and 3, the brake flange 21 has a braking surface 36 facing the adjacent one-way clutch element 34, and the brake flange 33 has a similar braking surface 38 facing the adjacent one-way clutch element 35. Interengagement between one and then the other of the braking surfaces 36, 38 and adjacent clutch elements 32 and 34 occurs upon application of axial thrust loads in opposite directions to the rod 4 because of the rotational torque load which is applied to the worm wheel 31 thereby. The lead angle of the worm 30/worm wheel 31 combination is such that rotation of the worm wheel 31 in opposite directions tends to both rotate and translate the worm 30 in opposite directions. Thus, for example, when a tension load is applied to the actuator rod 4 tending to extend the actuator, it tends to rotate the screw shaft 17 in a counterclockwise direction as viewed from the bearing 19 end of FIG. 1, which in turn tends to rotate the worm 30 in a clockwise direction as viewed from the left side of FIG. 1 and force the worm 30 toward such left side. This results in a clamping of the clutch element 34 between the brake flange 32 and a roller thrust bearing 42 disposed on the shaft 20 between the brake release piston 23 and brake flange. The thrust bearing 42 is prevented from moving toward the left by a shoulder 43 adjacent the inner end of the chamber 25.

The resulting frictional contact between the brake flange 32 and clutch element 34 tends to rotate the clutch element 34 in a clockwise direction, but the clutch element 34 is locked against rotation in that direction due to wedging engagement of the clutch rollers 44 between the cam surfaces 45 on the clutch element 34 and a stationary outer circular race 46 which is a part of the actuator housing 18. Since the frictional engagement between the brake flange 32 and adjacent clutch element 34 is directly proportional to the load and results in a braking torque that exceeds the torque due to the tension load applied to the actuator, the actuator will not extend under the influence of the tension load.

When a compressive load is applied to the actuator tending to move the rod 4 axially inwardly, the direction of all the forces is reversed, tending to rotate the screw shaft 17 in a clockwise direction, which tends to drive the worm gear 30 in a counterclockwise direction and exerts an axial thrust on the wormshaft 20 urging the brake flange 33 toward the right as viewed in FIG. 1 to clamp the other clutch element 35 between such brake flange 33 and a roller thrust bearing 47 on the shaft 20 which is prevented from moving toward the right by a shoulder 48 on the actuator housing adjacent the inner end of the chamber 26. The clutch element 35 is substantially identical to the clutch element 34, except that it has reverse locking capabilities and is prevented from rotation in a counterclockwise direction by wedging engagement of its rollers 49 between the associated cam surfaces 50 and a stationary outer circular race 51 on the actuator housing 18. As between the brake flange 32 and clutch element 34, the frictional contact between the brake flange 33 and clutch element 35 is directly proportional to the applied compressive load and results in a braking torque that exceeds the torque due to the compressive load thus to lock the actuator against retraction under compressive load.

Assuming that it is desired to extend the actuator while under tension load, fluid pressure need only be supplied to the outboard side of the brake release piston 23 through a port 52 in the actuator housing 18 as shown in FIG. 5. The pressure acting on the brake release piston 23 is transmitted to the wormshaft 20 through the ball bearing 21 and tends to move the brake flange 32 away from the clutch element 34 thus to relieve the clamping force on the clutch element 34. When the clamping force has been reduced to such an extent that the braking torque between the brake flange 32 and clutch element 34 is less than the torque applied to the screw shaft 17 by the tension load, the actuator will extend.

Fluid pressure may also be supplied to the extend port 8 of the actuator 1 to assist the tension load in extending the actuator as further shown in FIG. 5. The load applied to the actuator rod 4 by the fluid pressure will combine with the external load already on the rod to increase the braking torque between the brake flange 32 and clutch element 34. However, at the same time that the brake torque is increasing, the fluid pressure supplied to the outboard side of the brake release piston 23 is also increasing and tends to relieve the brake torque. At some intermediate fluid pressure, the torque acting on the screw shaft 17 because of the applied load will exceed the braking torque between the brake flange 32 and clutch element 34, whereby the actuator will extend under the combined influence of the external load and fluid pressure applied to the actuator.

However, in no event will a reversal in the external load cause a reversal in the direction of actuator movement in opposition to the applied load, since the fluid pressure acting on the outboard side of the brake release piston 23 is already tending to urge the brake flange 33 into tight clamping engagement with the clutch element 35. Accordingly, should the total compressive load acting on the actuator exceed the total tension load, the actuator will still not retract because the high braking torque between the brake flange 33 and clutch element 35 will tend to rotate the clutch element 35 in a counterclockwise direction, which is prevented due to the locking action of the clutch element 35 as previously described.

Retraction of the actuator 1 while subjected to external compressive loads is accomplished in substantially the same manner, except that fluid pressure is supplied to the outboard side of the brake release piston 24 through port 53 which tends to reduce the clamping force between the brake flange 33 and clutch element 35 as shown in FIG. 4. Fluid pressure may also be supplied to the retract port 9 of the actuator to assist the compressive load in retracting the actuator, and movement of the actuator in the reverse direction will be prevented due to the clamping engagement of the brake flange 32 with the clutch element 34 which is nonrotatable in the opposite direction.

During movements of the wormshaft 20 in one direction or the other due to axial thrust loads applied thereto either by the screw shaft 17 or by fluid pressure supplied to the outboard sides of one or the other of the brake release pistons 23 and 24, the variations in clearance between the roller thrust bearings 42 and 47 and associated stop shoulders 43 and 48 may be taken up by disposing relatively weak Belleville springs 54 between such roller thrust bearings and shoulders which expand and contract during such movements.

Assuming that it is desired to retract the actuator 1 while under tension load, fluid pressure is supplied to the retract port 9 of the actuator and also to the outboard side of the brake release piston 24 as shown in FIG. 4. As the fluid pressure is gradually increased, the tension load on the screw shaft 17 is gradually reduced because an increasing proportion of the external load on the actuator rod 4 is carried by the fluid pressure acting on the actuator piston 3. This results in a reduction in the axial thrust load applied to the wormshaft 20 by the screw shaft 17 tending to urge the brake flange 32 into tight clamping engagement with the clutch element 34. At the same time, however, the fluid pressure which is applied to the outboard side of the brake release piston 24 pushes the wormshaft 20 toward the left as viewed from the right end of FIG. 1 tending to increase the frictional engagement between the brake flange 32 and clutch element 34. When the fluid pressure force acting on the retract side of the piston 3 exceeds the external tension load, the torque applied to the wormshaft 20 reverses, thereby tending to rotate the wormshaft in a counterclockwise direction. Now the actuator will retract despite the tight frictional engagement between the brake flange 32 and clutch element 34, since the clutch element 34 is nonlocking when rotated in a counterclockwise direction.

The brake release piston 24 will continue to hold the brake flange 32 clamped against the clutch element 34 thus to prevent the low torque on the screw shaft 17 which is necessary to rotate the clutch element 34 in the nonlocking direction through the worm wheel 31 and worm 30 from forcing the brake flange 33 into contact with the clutch element 35 and locking the actuator.

Should the tension load applied to the actuator substantially increase to a level above the retraction load exerted on the actuator by fluid pressure, the direction of actuator movement will not reverse despite a reversal in the direction of applied force because of the braking torque which has been established between the brake flange 32 and clutch element 34 which prevents extension of the actuator.

Extension of the actuator when subjected to a compressive load may also be achieved by supplying fluid pressure to the extend port 8 and to the outboard side of the brake release piston 23. When the fluid pressure tending to extend the actuator becomes sufficient to overcome the compressive force and the frictional contact between the brake flange 32 and clutch element 34 has been reduced by the force acting on the release piston 23 tending to urge the wormshaft 20 in the opposite direction, the actuator will extend, and the resulting frictional engagement between the brake flange 33 and clutch element 35 will prevent movement of the actuator in the reverse direction in the event that the compressive load should increase to a level above the force exerted on the piston by the extend pressure.

From the foregoing, it will now be apparent that the locking mechanism of the present invention will effectively prevent actuator movements in either direction due to external loads unless released, and even then will not permit a reversal in the direction of movement of the actuator despite a substantial change in the magnitude and/or direction of external load.

I, therefore, particularly point out and distinctly claim as my invention:

1. In combination, an actuator comprising a cylinder and a piston axially reciprocable in said cylinder; and a locking mechanism for releasably locking said actuator against axial movement in opposite directions comprising a screw shaft rotatably driven in opposite directions by said piston during reciprocation thereof, a transverse shaft, means for rotatably and transversely urging said transverse shaft in opposite directions in response to opposite rotational forces applied to said screw shaft by said piston, a pair of one-way clutch elements having reverse locking capabilities, and a pair of brake flanges fixed to said transverse shaft for movement therewith into frictional contact with said clutch elements for driving said clutch elements in their respective locking directions thus to lock said piston against movement, fluid pressure responsive means for urging said brake flanges away from the clutch element driven in the lock direction by an applied load to said piston to permit movement of said piston in one direction and urging said brake flanges toward the other clutch element to provide a drive connection therebetween precluding movement of said piston in the reverse direction, and a housing for said locking mechanism, said fluid-pressure-responsive means comprising a pair of pistons contained in chambers in said housing adjacent opposite ends of said transverse shaft.

2. The combination of claim 1 further comprising bearings in said pistons, opposite ends of said transverse shaft being journaled in said bearings for movement therewith.

3. The combination of claim 1 wherein said clutch elements are slidably and rotatably received on said transverse shaft between said pistons and brake flanges, and shoulders are provided on said housing adjacent the inner ends of said chambers for limiting the movement of said clutch elements toward said chambers.

4. The combination of claim 3 further comprising thrust bearings interposed between said shoulders and clutch elements for absorbing axial thrust loads applied to said clutch elements by said brake flanges.

5. The combination of claim 4 further comprising Belleville springs between said thrust bearings and shoulders for taking up the clearance therebetween during movement of said brake flanges away from said shoulders.

6. In combination, an actuator comprising a cylinder and a piston axially reciprocable in said cylinder; and a locking mechanism for releasably locking said piston against axial movement in opposite directions comprising a pair of one-way clutch elements having reverse locking capabilities, said one-way clutch elements being freely rotatable in opposite directions and nonrotatable in the reverse directions, means for alternately establishing drive connections between said piston and said clutch elements in response to applied loads to said piston in opposite directions to lock said piston against movement, and means for selectively disconnecting the drive connection to one of the clutch elements and establishing the drive connection to the other clutch element to permit movement of said piston in one direction while preventing movement in the reverse direction.

7. In combination, an actuator comprising a cylinder and a piston axially reciprocable in said cylinder; and a locking mechanism for releasably locking said actuator against axial movement in opposite directions comprising a screw shaft rotatably driven in opposite directions by said piston during reciprocation thereof, a transverse shaft, means for rotating said transverse shaft and urging said transverse shaft in opposite directions transversely of said screw shaft in response to opposite rotational forces applied to said screw shaft by said piston, a pair of one-way clutch elements having reverse locking capabilities, said one-way clutch elements being freely rotatable about said transverse shaft in opposite directions and nonrotatable in the reverse directions and a pair of brake flanges fixed to said transverse shaft for axial movement therewith in opposite directions into frictional contact with one or other of said clutch elements for driving said clutch elements in their respective locking directions for locking said transverse shaft and thus said screw shaft against rotation which locks said piston against axial movement.

8. The combination of claim 7 further comprising fluid-pressure-responsive means for urging said brake flanges away from the clutch element driven in the lock direction by an applied load to said piston to permit movement of said piston in one direction and urging said brake flanges toward the other clutch element to provide a drive connection therebetween precluding movement of said piston in the reverse direction.

9. The combination of claim 7 wherein said clutch elements are axially movable relative to said transverse shaft, and means are provided for limiting such axial movement of said clutch elements to permit frictional contact by said brake flanges.

10. The combination of claim 7 wherein said means for rotating said transverse shaft and urging said transverse shaft in opposite directions comprises a worm wheel mounted on said screw shaft for rotation therewith, and a worm gear on said transverse shaft having meshing engagement with said worm wheel.

11. The combination of claim 7 wherein said locking mechanism is contained in a housing, and said one-way clutch elements have oppositely extending cam surfaces, and rollers which are wedged between said cam surfaces and said housing to prevent rotation of said clutch elements in opposite directions.